United States Patent
Fine et al.

(10) Patent No.: US 10,320,228 B2
(45) Date of Patent: Jun. 11, 2019

(54) POWER COUPLING DEVICE

(71) Applicant: Empire Technology Development LLC, Wilmington, DE (US)

(72) Inventors: Kevin S. Fine, Yverdon-les-Bains (CH); Ezekiel Kruglick, Poway, CA (US)

(73) Assignee: Empire Technology Development LLC, Wilmington, DE (US)

( * ) Notice: Subject to any disclaimer, the term of this patent is extended or adjusted under 35 U.S.C. 154(b) by 731 days.

(21) Appl. No.: 14/479,909

(22) Filed: Sep. 8, 2014

(65) Prior Publication Data

US 2016/0072297 A1   Mar. 10, 2016

(51) Int. Cl.
| | |
|---|---|
| *H02J 5/00* | (2016.01) |
| *H02J 17/00* | (2006.01) |
| *H02J 50/12* | (2016.01) |
| *H02J 7/02* | (2016.01) |

(52) U.S. Cl.
CPC .............. *H02J 17/00* (2013.01); *H02J 50/12* (2016.02); *H02J 7/025* (2013.01)

(58) Field of Classification Search
CPC ........................ H02J 17/00; H02J 50/00–50/90; H02J 5/005; H04B 5/00; H04B 5/0012; H04B 5/0025; H04B 5/0037; H04B 5/0075–5/0093
See application file for complete search history.

(56) References Cited

U.S. PATENT DOCUMENTS

| | | | | |
|---|---|---|---|---|
| 5,005,001 | A | * | 4/1991 | Cordery ............. G08B 13/2477 340/551 |
| 5,764,196 | A | * | 6/1998 | Fujimoto ............... H01Q 7/005 343/742 |
| 5,940,765 | A | | 8/1999 | Haartsen |
| 7,126,450 | B2 | | 10/2006 | Baarman et al. |
| 8,024,012 | B2 | | 9/2011 | Clevenger et al. |
| 8,115,448 | B2 | | 2/2012 | John |
| 8,169,185 | B2 | | 5/2012 | Partovi et al. |
| 8,390,249 | B2 | | 3/2013 | Walley et al. |
| 8,559,659 | B2 | | 10/2013 | Chu et al. |
| 9,384,885 | B2 | | 7/2016 | Karalis et al. |
| 9,515,512 | B2 | * | 12/2016 | O'Donnell .............. H02J 7/025 |
| 2002/0178385 | A1 | | 11/2002 | Dent et al. |

(Continued)

FOREIGN PATENT DOCUMENTS

| | | |
|---|---|---|
| CN | 101645618 A | 2/2010 |
| CN | 101971453 A | 2/2011 |

(Continued)

OTHER PUBLICATIONS

Jamonation, "SCYP Wifi Localization Tool Demo," accessed at http://www.youtube.com/watch?v=nTd-mCzlwYM, uploaded on Dec. 11, 2008, pp. 1-2.

(Continued)

*Primary Examiner* — Huy Q Phan
*Assistant Examiner* — David B Frederiksen

(57) ABSTRACT

Systems and methods to wirelessly transmit power are provided. A coil assembly is provided. In some examples, the coil assembly is configured to generate a signal in response to an ambient field, and to magnetically couple with a device to deliver power to the device.

29 Claims, 5 Drawing Sheets

(56) References Cited

U.S. PATENT DOCUMENTS

| | | | | |
|---|---|---|---|---|
| 2009/0093227 | A1* | 4/2009 | Egelmeers | H03H 7/0153 455/226.1 |
| 2009/0176450 | A1* | 7/2009 | Chow | H01L 23/48 455/41.1 |
| 2010/0034238 | A1 | 2/2010 | Bennett | |
| 2010/0174629 | A1 | 7/2010 | Taylor et al. | |
| 2010/0201201 | A1 | 8/2010 | Mobarhan et al. | |
| 2010/0201315 | A1* | 8/2010 | Oshimi | H01M 10/46 320/108 |
| 2010/0219694 | A1 | 9/2010 | Kurs et al. | |
| 2010/0225270 | A1 | 9/2010 | Jacobs et al. | |
| 2010/0276995 | A1 | 11/2010 | Marzetta et al. | |
| 2010/0295378 | A1* | 11/2010 | Suzuki | H02J 7/025 307/104 |
| 2012/0001485 | A1* | 1/2012 | Uchida | H02J 5/005 307/11 |
| 2012/0019074 | A1 | 1/2012 | Frolov et al. | |
| 2012/0080957 | A1* | 4/2012 | Cooper | H02J 5/005 307/104 |
| 2012/0112552 | A1 | 5/2012 | Baarman et al. | |
| 2012/0153739 | A1* | 6/2012 | Cooper | H02J 7/025 307/104 |
| 2012/0169139 | A1* | 7/2012 | Kudo | H02J 5/005 307/104 |
| 2012/0212074 | A1 | 8/2012 | Uchida | |
| 2012/0235508 | A1* | 9/2012 | Ichikawa | H02J 5/005 307/104 |
| 2012/0290470 | A1 | 11/2012 | Lee et al. | |
| 2012/0326660 | A1 | 12/2012 | Lu et al. | |
| 2013/0069587 | A1* | 3/2013 | Kuk | H02J 5/005 320/108 |
| 2013/0106347 | A1* | 5/2013 | Kallmyer | A61N 1/3787 320/108 |
| 2013/0134792 | A1* | 5/2013 | Bunsen | G01R 27/04 307/104 |
| 2013/0147428 | A1 | 6/2013 | Kirby et al. | |
| 2013/0234527 | A1* | 9/2013 | Ishihara | H04B 5/0037 307/104 |
| 2013/0249306 | A1 | 9/2013 | Kim et al. | |
| 2013/0271069 | A1 | 10/2013 | Partovi | |
| 2013/0300210 | A1 | 11/2013 | Hosotani | |
| 2013/0307344 | A1 | 11/2013 | Cheon et al. | |
| 2014/0021798 | A1 | 1/2014 | Kesler et al. | |
| 2014/0035385 | A1* | 2/2014 | Hatanaka | H02J 5/005 307/104 |
| 2014/0197694 | A1* | 7/2014 | Asanuma | H01F 38/14 307/104 |
| 2014/0300202 | A1* | 10/2014 | Shimokawa | H02J 7/025 307/104 |
| 2014/0320369 | A1* | 10/2014 | Azenui | H01Q 1/526 343/841 |
| 2015/0001955 | A1* | 1/2015 | Yamada | H02J 5/005 307/104 |
| 2015/0048976 | A1* | 2/2015 | Petersen | H04B 5/0075 342/367 |
| 2015/0180548 | A1* | 6/2015 | Roh | H04B 5/0031 455/41.1 |
| 2015/0280482 | A1* | 10/2015 | Rosenfeld | H02J 7/025 320/108 |

FOREIGN PATENT DOCUMENTS

| | | |
|---|---|---|
| CN | 102082449 A | 6/2011 |
| CN | 202475041 U | 10/2012 |
| CN | 202651905 U | 1/2013 |
| CN | 103248139 A | 8/2013 |
| CN | 203261135 U | 10/2013 |
| CN | 103843229 A | 6/2014 |
| WO | 2010047850 A1 | 4/2010 |
| WO | 2012157115 A1 | 11/2012 |
| WO | 2013102908 A1 | 7/2013 |

OTHER PUBLICATIONS

"Apple Reveals Master Details of Wireless Charging System," accessed at http://web.archive.org/web/20140726222945/http://www.patentlyapple.com/patently-apple/2013/09/apple-reveals-master-details-of-wireless-charging-system.html, posted on Sep. 19, 2013, pp. 1-9.

"Cryptographically secure pseudorandom number generator," Accessed at http://web.archive.org/web/20140404073330/http://en.wikipedia.org/wiki/Cryptographically_secure_pseudorandom_number_generator, Accessed on Aug. 30, 2014, pp. 1-7.

"DIGI-Key corporation," Accessed at http://www.digikey.com/product-detail/en/STL25N15F3/497-8785-6-ND/2043712, Accessed on Aug. 30, 2014, pp. 1-2.

"E-textiles," accessed at http://web.archive.org/web/20140701073636/http://en.wikipedia.org/wiki/E-textiles, last modified on May 28, 2014, pp. 1-17.

"Inductance," accessed at http://web.archive.org/web/20140413101910/http://en.wikipedia.org/wiki/Inductance, last modified on Mar. 20, 2014, pp. 1-14.

"Localization using WiFi Signal Strength," accessed at http://web.archive.org/web/20100707014422/http://robotics.usc.edu/~ahoward/projects_wifi.php, accessed on Aug. 29, 2014, pp. 1-2.

"Murata Taps Capacitive-Coupled Method for Wireless Power Transfer," Technology Focus, Murata Manufacture Co. Ltd., pp. 35-37 (Nov. 2011).

"N-channel 150 V, 0.045 Ω, 6 A PowerFLAT™ (6x5) STripFET™ III Power MOSFET," Accessed at http://www.st.com/st-web-ui/static/active/en/resource/technical/document/datasheet/CD00227531.pdf, pp. 1-12 (Mar. 2009).

"Power-line communication," accessed at http://web.archive.org/web/20140821163104/http://en.wikipedia.org/wiki/Power_line_communication, last modified on Aug. 17, 2014, pp. 1-12.

"Q factor," Accessed at http://web.archive.org/web/20140415212242/http://en.wikipedia.org/wiki/Q_factor, last modified on Mar. 17, 2014, pp. 1-10.

"Varicap," accessed at http://web.archive.org/web/20090628171327/http://en.wikipedia.org/wiki/Varactor, last modified on May 29, 2009, pp. 1-2.

"Varicap," Accessed at http://web.archive.org/web/20140415122319/http://en.wikipedia.org/wiki/Varicap, Accessed on Mar. 13, 2014, pp. 1-10.

"Wireless Electricity Delivered Over Distance," accessed at http://web.archive.org/web/20140426154458/http://www.witricity.com/index.html, accessed on Aug. 29, 2014, p. 1.

"WiSpry: Dynamically Tunable RF," accessed at http://web.archive.org/web/20131208154954/http://wispry.com/index.php, accessed on Aug. 29, 2014, p. 1.

"WiTricity Corp.," accessed at http://web.archive.org/web/20140426154535/http://www.witricity.com/pages/company.html, accessed on Aug. 29, 2014, p. 1.

"WS1050 Tunable RF Capacitor," WiSpry, Inc., pp. 1-3 (2013).

Balouchi, F., and Gohn, B., "Wireless Power: Mobile Devices, Consumer Electronics, Industrial Devices, Wireless Power Infrastructure, and Wireless Charging of Electric Vehicles: Technology Analysis, Environmental Impact, and Market Forecasts," Pike Research Report, pp. 1-6 (2Q 2012).

Butler, K., "Tour WiTricity's Room of Tomorrow: Wireless Charging That's Flexible," accessed at http://web.archive.org/web/20140402220152/http://blog.laptopmag.com/tour-witricitys-room-of-tomorrow-wireless-charging-thats-flexible, posted on Jan. 12, 2013, pp. 1-4.

Cannon, B.L. et al., "Magnetic resonant coupling as a potential means for wireless power transfer to multiple small receivers," IEEE Transactions on Power Electronics, vol. 24, No. 7, pp. 1819-1825 (2009).

Endler, M., "Intel Charges Ahead With WCT Wireless Power Standard," accessed at http://web.archive.org/web/20121127140531/http://www.informationweek.com/hardware/processors/intel-charges-ahead-with-wct-wireless-po/240006662?, posted on Sep. 4, 2012, pp. 1-3.

(56) References Cited

OTHER PUBLICATIONS

Karalis, A., et al., "Efficient wireless non-radiative mid-range energy transfer," Annals of Physics, vol. 323, No. 1, pp. 34-48 (2008).
Kurs, A., et al. "Wireless power transfer via strongly coupled magnetic resonances," Science, vol. 317, pp. 83-86 (Aug. 17, 2007).
Mohan, C. and Raj, M.K., "Wireless Power Transmission & Charging of Batteries in Multiple Electronic Accessories," International Journal of Science, Engineering and Technology Research (IJSETR), vol. 2, No. 1, Jan. 2013, pp. 8-17.
Morris, K., "Highly Resonant Wireless Power Transfer: Safe, Efficient, and over Distance," WiTricity Corporation, pp. 1-32 (2013).
Nalty, K., "Classical Calculation for Mutual Inductance of Two Coaxial Loops in MKS Units," Austin, TX 78750 USA, pp. 1-8 (Mar. 6, 2011).
Rattner, J., "Rattner: The Promise of Wireless Power," Accessed at http://blogs.intel.com/intellabs/2008/10/02/rattner_the_prornise_of wireles/, posted on Oct. 2, 2008, pp. 1-5.
Sample, A.P., et al., "Analysis, experimental results, and range adaptation of magnetically coupled resonators for wireless power transfer," IEEE Transactions on Industrial Electronics, vol. 58, No. 2, pp. 544-554 (2011).
Tsui, A.W.T., et al., "Accuracy Performance Analysis between War Driving and War Walking in Metropolitan Wi-Fi Localization," IEEE Transactions on Mobile Computing, vol. 9, No. 11, pp. 1551-1562 (Nov. 2010).
Weingartner, M., "Wireless Power—Wireless Resonant Energy Link (WREL)," Accessed at http://web.archive.org/web/20130116070245/http://newsroom.intel.com/docs/DOC-1119, last modified on Jul. 8, 2010, pp. 1-2.
Woodward, C., "WiTricity's Wireless-Power Tech Attracts $25M from Intel, Foxconn," accessed at http://web.archive.org/web/20131203220433/http://www.xconomy.com/boston/2013/10/23/witricitys-wireless-power-tech-attracts-25m-intel-foxconn/, posted on Oct. 23, 2013, pp. 1-3.
Zhou, X., et al., "Wireless information and power transfer: Architecture design and rate-energy tradeoff," Global Communications Conference (GLOBECOM), 2012 IEEE, pp. 3982-3987 (Dec. 3-7, 2012).

* cited by examiner

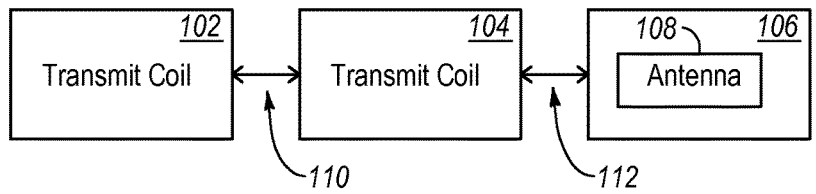
FIG. 1A
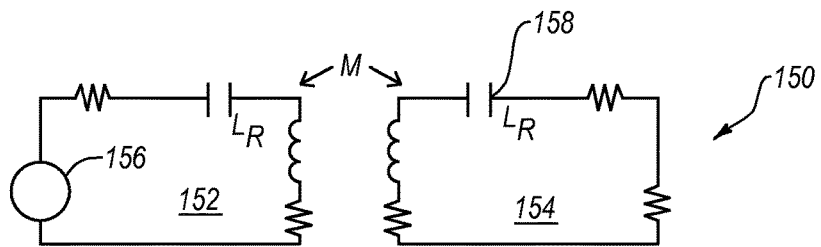
FIG. 1B
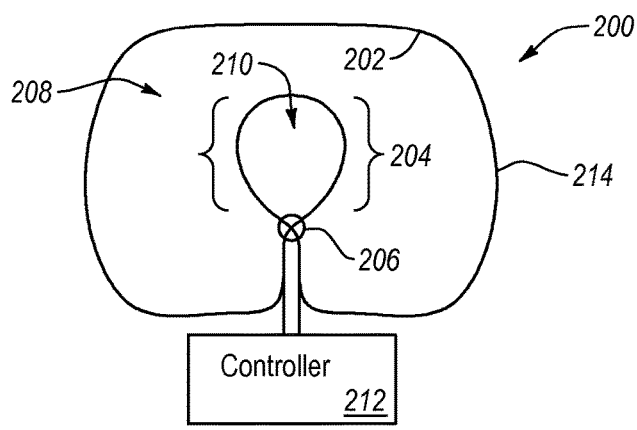
FIG. 2
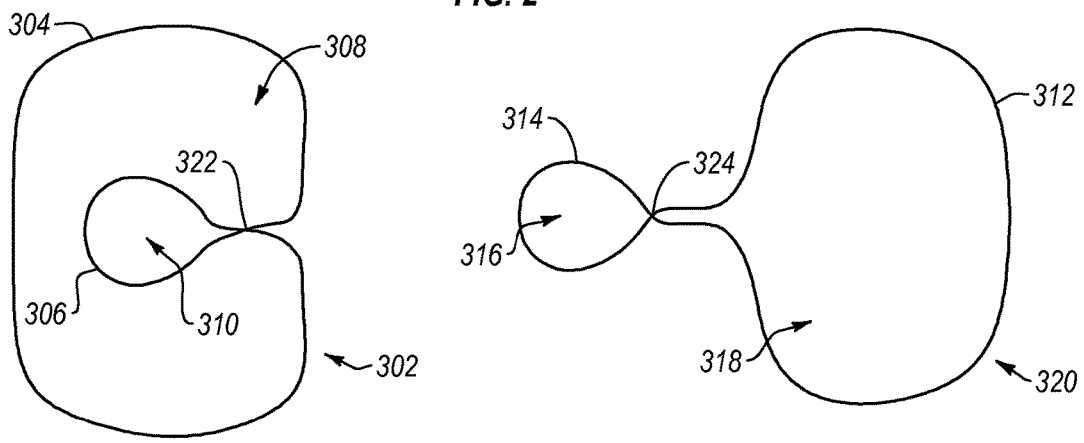
FIG. 3A  FIG. 3B

POWER COUPLING DEVICE

TECHNICAL FIELD

The present disclosure generally but not exclusively relates to wireless power transmission.

BACKGROUND

Unless otherwise indicated herein, the materials described in this section are not prior art to the claims in this application and are not admitted to be prior art by inclusion in this section.

Wireless power transfer is a technology that can wirelessly transfer power to a device. This technology can be used, for example, to charge a device's batteries using a signal that is delivered to the device wirelessly. Wireless power transfer systems can be deployed in various locations such as coffee shops and airports.

However, the nature of devices that require charging can complicate the process. Many devices that could benefit from wireless power transfer, such as smartphones, tablet devices, and game controllers, are small and portable. The size of these devices, however, limits the ability to efficiently deliver power wirelessly. As a result, the ability of a device to capture wireless power is limited.

SUMMARY

Some embodiments disclosed herein relate to an apparatus for delivering a signal from a transmit coil to a device. The apparatus includes a first coil, a second coil, and a controller. The first coil is configured to couple with the transmit coil such that a first signal is induced in the first coil, for example by electromagnetic radiation transmitted by the transmit coil. The second coil is connected with the first coil such that the first signal is present in the second coil. The second coil is configured to couple with the device. The controller is configured to adjust a resonant frequency of the first coil to match a drive frequency of the transmit coil.

In some examples, the controller may include a rectifier, an adjustable capacitance, and control logic. The control logic adjusts the adjustable capacitance such that the resonant frequency substantially matches the drive frequency.

Illustrative embodiments disclosed herein relate to apparatus configured to couple with a transmit coil to deliver a signal to a device. An example apparatus includes a host object, a coil assembly, and a controller. The coil assembly is attached to the host object and is configured to couple with the transmit coil such that the coil assembly delivers a first signal to the device and such that the device receives power. The controller is configured to change a resonant frequency of the coil assembly to match a drive frequency of the transmit coil. The coil assembly may include a receive coil and a coupler coil.

Some embodiments disclosed herein relate to systems for delivering a signal to a coil disposed inside a device such that the device receives power wirelessly. The system includes a host object, a first coil, a second coil, and a controller. The first coil may be incorporated into the host object and is responsive to a first signal received by the first coil. The second coil may be incorporated into the host object and is configured to couple with the coil disposed inside the device to transfer power to the device. The controller is configured to determine when the second coil is delivering a signal and to adapt a resonant frequency of the first coils in response to changes in an area of the first coil.

Some embodiments disclosed herein relates to an apparatus configured to deliver wireless power to an electronic device. The apparatus includes a receive coil that is configured to produce an electrical signal in response to electromagnetic radiation and a coupler coil connected with the first coil such that the electrical signal passes through the coupler coil. An area of the receive coil may be at least two times greater than an area of the coupler coil. The apparatus may also include an adjustable capacitor whose capacitance can be adjusted, a controller configured to adjust the adjustable capacitance so that the resonant frequency of the receive coil is approximately equal to a frequency of the electromagnetic radiation, and a host object that supports the receive coil, the coupler coil, and the controller. The host object supports the electronic device such that the coupler coil delivers wireless power to the electronic device when the electromagnetic radiation is present.

Some embodiments disclosed herein relate to methods for wirelessly transferring energy to a device. An example method includes wireless receiving a first signal at a first coil, converting a current that is generated in the first coil in response to the first signal into a detection signal, and adjusting a reactance that is associated with the first coil based on the detection signal such that a resonant frequency of the first coil matches a drive frequency of the first signal.

Some embodiments disclosed herein relate to methods for providing wireless energy to an electronic device. An example method may include placing the electronic device on a surface of a host object, which may include a receive coil and a coupler coil, and receiving the wireless energy through a coupling between the device coil and the coupler coil. A current is induced in the receive coil by an ambient electromagnetic field and current flows through the coupler coil to provide the wireless energy.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIG. 1A illustrates an example of an environment where a coil assembly is configured to deliver power wirelessly to a device.

FIG. 1B illustrates an example of an equivalent circuit of a transmit coil and a receive coil in a coil assembly.

FIG. 2 depicts an illustrative example of a coil assembly.

FIG. 3A illustrates an example of a coil assembly.

FIG. 3B illustrates an example of a coil assembly.

DETAILED DESCRIPTION

Figure 4:
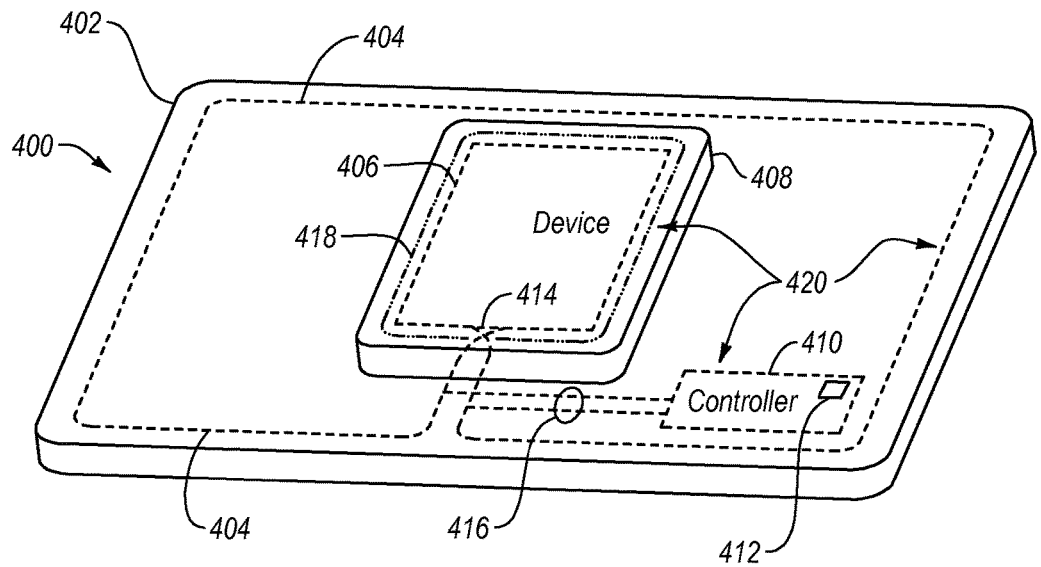
FIG. 4 illustrates an example of an apparatus that may be configured to deliver power to a device wirelessly.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. The aspects of the present disclosure, as generally described herein, and illustrated in the figures, can be arranged, substituted, combined, separated, and designed in a wide variety of different configurations, all of which are explicitly contemplated herein.

Illustrative embodiments relate to power coupler systems that can augment the power delivered wirelessly to various devices. An example coupler system may include a coil assembly. The coil assembly can receive a signal that can be used to deliver power (e.g., as a magnetic signal) to a device, and may allow power delivery over a larger distance compared to an antenna of a device, and/or enhance the power delivery compared to the use of the device antenna alone. The coil assembly may be configured to couple a signal into the device at short range efficiently, for example by comprising a relatively large receive coil and a relatively small coupler coil. The coil assembly may also include a controller that is able to adjust characteristics of the coil assembly such that the ability of the coil assembly to deliver power to the device is maximized.

The coil assembly may include a wire formed from a metal such as copper, or other electrically conducting material. The wire is arranged into a coil that may include one or more turns. The coil assembly may include a first coil (e.g., a receive coil) that can wirelessly couple with another coil (e.g., a transmit coil). In some examples, the receive coil (R) and the transmit coil (T) are coupled by a mutual inductance ($M_{RT}$), which decreases as the receive coil and the transmit coil are moved further apart. In one example, the maximum practical distance over which power can be received depends upon geometry of the receive coil and/or the transmit coil. In one example, the maximum practical distance is approximately two times the diameter of the transmitting coil. The receive coil and the transmit coil may also have their own inductance ($L_R$ and $L_T$).

For example, when the transmit coil is energized (an alternating current passes through the transmit coil), an alternating magnetic field is generated. The receive coil is coupled to the transmit coil by the magnetic field and a signal is generated in the receive coil in response to the magnetic field generated by the transmit coil.

The coil assembly may also include a smaller second coil (e.g., a coupler coil), the coil assembly being configured so that the current induced in the receive coil also passes through the coupler coil. The current that passes through the coupler coil is associated with a corresponding magnetic field. The magnetic field associated with the coupler coil can couple with an antenna (e.g., a device coil) in a device. When the coupler coil couples with the device coil, a current is generated in the device coil. This current can be used by the device, for example, to charge a battery or for another purpose. The receive coil and the coupler coil cooperate to deliver power to a device wirelessly.

More generally, the coil assembly may include a first coil that may be connected with a second coil. The second coil may have a different geometric extent than the first coil, and may be, for example, appreciably smaller than the first coil. The first coil may be configured to couple with a signal that may be generated at a source. A current may be induced in the first coil in response to the received signal. The first coil and the second coil are configured such that the signal induced in the first coil is also present in the second coil. The induced current allows the second coil to couple with the device's antenna (e.g., another coil such as a device coil) such that at least a part of power associated with the signal received by the first coil is delivered to the device. For example, if a current is generated in the antenna of the device, the current can be used to charge a battery of the device or for another purpose.

The coil assembly allows power to be transferred to the device more quickly and with greater effect and higher transfer efficiencies. The controller that may be included in the coil assembly can adjust a reactance of the coil assembly such that a Q (quality factor) of the coil assembly remains high. A high Q indicates a lower rate of energy loss relative to a stored energy of the coil. A high Q ensures that more energy is delivered to the device.

FIG. 1A illustrates an example of an environment where a coil assembly is configured to deliver power wirelessly to a device. FIG. 1A illustrates a transmit coil 102, a coil assembly 104, and a device 106. The transmit coil 102 is an example of a transmit device that can generate a signal that can be wirelessly received by the coil assembly or that can couple with the coil assembly 104. For example, when the transmit coil 102 includes a loop wire or one or more turns, an alternating current flowing through the transmit coil 102 can generate a magnetic field that is received by the coil assembly 104. In this manner, the coil assembly 104 is magnetically coupled with the transmit coil 102. In one example, the transmit coil 102 is magnetically coupled with the coil assembly 104 when a current flowing in the transmit coil induces a voltage in the coil assembly 104 through electromagnetic induction. A strength of the coupling can between the transmit coil 102 and the coil assembly 104 can depend on a distance between them, their relative shapes, and a relationship to a common axis.

Once the coil assembly 104 is coupled with the transmit coil 102, the coil assembly 104 can similarly couple with the antenna 108 of the device 106. Once the coil assembly 104 is wirelessly coupled with the antenna 108, power can be delivered to the device 106 via the coil assembly 104. The coil assembly 104 is larger than the antenna 180 of the device 106 and effectively functions as the antenna of the device 106. In one example, the power delivered to the device 106 is augmented by an increase in the area between the antenna 108 of the device 106 and the coil assembly 104 squared.

More specifically, in the illustrative example of FIG. 1A, a signal is generated by a transmit coil 102. For example an alternating current may flow in the transmit coil 102. The signal is generated, in one example, when a current is provided to or generated in the transmit coil 102. The current that flows in the transmit coil 102 generates a field that includes a magnetic field.

When the signal, such as the alternating or changing current, is present in the transmit coil 102, the coil assembly 104 may magnetically couple with the transmit coil 102. When the coil assembly 104 is coupled with the transmit coil 102, a signal is present in or induced in the coil assembly 104. More specifically, an electromotive force (e.g., a voltage and/or current) may be present in the coil assembly 104 because of the magnetic induction between the transmit coil 102 and the coil assembly 104.

Similarly, the signal or current in the coil assembly 104 that is responsive to the magnetic field of the transmit coil 102 can induce a signal in the device 106. More specifically, the coil assembly 104 can magnetically couple with the antenna 108 (e.g., a coil) in the device 106. The signal (e.g., voltage and/or current) induced in the antenna 108 can be used by the device 106, by way of example only, to charge a battery of the device 106.

FIG. 1B illustrates an example of an equivalent circuit of a transmit coil and a receive coil in a coil assembly. FIG. 1B illustrates a transmit coil 152 that includes an inductance $L_T$. The transmit coil 152 can magnetically couple with a receive coil 154, which includes an inductance $L_R$. The transmit coil and the receive coil have a mutual inductance $M_{RT}$. FIG. 1B illustrates that the transmit coil 152 is driven by a source 156 at a drive frequency $f_D$. As described in more detail below, a Q (quality factor) of the receive coil 154 is kept high by adjusting a reactance 158 of the receive coil 154 such that a resonant frequency of the receive coil 154 matches or substantially matches the drive frequency of the transmit coil 154.

FIG. 2 depicts an illustrative example of a coil assembly. More specifically, FIG. 2 illustrates an example of a coil assembly 200, which is an example of the coil assembly 104. The coil assembly 200 may include a receive coil 202, a coupler coil 204, and/or a controller 212. The receive coil 202 may have an area 208 that is larger than an area 210 of the coupler coil 204. The coil assembly 200 may include one or more turns of a wire 214. In one example, the coil assembly 200 may be configured such that the wire 214 crosses itself at a location 206. The wire 214 may be configured to form a closed loop. The receive coil 202 and the coupler coil 204 may be separated by the location 206.

FIG. 2 illustrates that the receive coil 202 and the coupler coil 204 may be formed from the same wire 214 and that the receive coil 202 and the coupler coil 204 can be formed by twisting the wire 214 such that the wire 214 crosses itself at a location 206. In addition, the wire 214 may be flexible. Because the wire 214 is flexible, characteristics of the coil assembly such as the area 208 of the receive coil 202 and/or the area 210 of the coupler coil 204 may change. A corresponding shape of the receive coil 202 and/or the coupler coil 204 may also occur. The change in characteristics of the receive coil 202 and/or the coupler coil 204 can affect a resonant frequency of the coil assembly 200. In other words, a change in these characteristics can affect how well the coil assembly 200 couples with the signal that is received from the transmit coil.

The coil assembly 200, however, is also configured to adjust the resonant frequency of the coil assembly. In an illustrative example, the coil assembly 200 may include a controller 212. The controller 212 is configured to adapt a reactance of the coil assembly 200 such that the resonant frequency continues to match that of the transmit coil. More specifically, the coil assembly 200 is associated with a resonant frequency. However, the resonant frequency of the coil assembly 200 changes when characteristics of the coil assembly change. In order to maintain efficient coupling of power, the resonant frequency of the coil assembly needs to be changed such that the resonant frequency matches or substantially matches a frequency associated with the transmit coil.

For example, as the characteristics of the coil assembly change, the controller 212 adapts the resonant frequency of the coil assembly 200 (e.g., the receive coil 202) to match or substantially match a frequency of the transmit coil. Because the resonant frequency of the coil assembly 200 may be related to an associated inductance (L) and/or an associated capacitance (C). The controller 212 can adjust at least one of these values to adjust the resonant frequency in accordance with changes to the characteristics of the coil assembly 200. The controller 212 may be configured to maintain an accurate match between the resonant frequency of coil assembly 200 and the frequency of the transmit coil.

In one example, the receive coil 202 and the coupler and the coupler coil 204 are associated with the same resonant frequency. By adjucting an associated inductance and/or an associated capacitance, the frequency of the whole circuit (e.g., both the receive coil 202 and the coupler coil 204) are adjusted at the same time. However, the coil assembly 200 is arranged such that the receive coil 202 can magnetically couple with a transmit coil and such that the coupler coil 204 can couple magnetically with a device.

FIG. 3A illustrates an example of a coil assembly. More specifically, FIG. 3A illustrates a coil assembly 302, which is an example of the coil assembly 104. The coil assembly 302 may include a receive coil 304 that includes an area 308. The coil assembly 302 may also include a coupler coil 306 that includes an area 310. In the coil assembly 302, the coupler coil 306 is located inside the area 308. In one example, a magnetic field associated with the receive coil 304 is in the same direction or in substantially the same direction as a magnetic field associated with the coupler coil 306. The receive coil 304 and the coupler coil 306 may be arranged in the same plane or in separate planes. In addition, both the coupler coil 306 and the receive coil 304 may each include bends and may be non-planar. In one example, the wire forming the coil assembly 302 may cross itself at a location 322. In on example, the wire forming the coil assembly 302 crosses itself at the location 322. In another example, the wire forming the coil assembly 302 does not cross itself at the location. In the latter example, the wire may be brought close together in order to form an appropriate magnetic field.

FIG. 3B illustrates an example of a coil assembly. FIG. 3B illustrates a coil assembly 320, which is also an example of the coil assembly 104. The coil assembly 320 may include a receive coil 312 that includes an area 318 and a coupler coil 316 that includes an area 316. In the coil assembly 320, the coupler coil 314 is outside of the area 318. The coupler coil 314 and the receive coil 312 can be arranged in the same plane or in different planes. In addition, both the coupler coil 314 and the receive coil 312 may each include bends and may be non-planar. A wire forming the coil assembly 320 may cross itself at a location 324. Representative sizes of the receive coil range from a mouse pad (300 cm$^2$) to several m$^2$ for coils embedded in carpets and the coupler coil from smartphone size (100 cm$^2$) down to smartwatch size (1 to a few cm$^2$). Other sizes are encompassed within the disclosure.

The wire forming the coil assembly 320 may be thin so as to be flexible. In one example, the wire for a particular coil assembly may be selected based on anticipated characteristics of the coil assembly. The wire radius may be, for example, 1% of the anticipated radius of the coil assembly or one of the coils in the coil assembly. Because the ratios of the coil and the thickness (e.g., cross sectional area) of the wire are related to the resistance of the coil, these values can be selected in a manner that can maximize the efficiency for various coil assemblies. Larger radius wire is heavier and more expensive while small radius wire has large resistance which increases Q and decreases efficiency. Typically the choice for the wire radius is a fraction of one percent to several percent of the coil radius.

In an illustrative example, the wire forming the turn or turns of the coil assembly may cross itself at one or more locations. Whether the wire crosses itself may depend on the orientation and/or location of the receive coil relative to the coupler coil and to directions of the corresponding magnetic fields.

In an illustrative example, the area of the receive coils may be two, three, five, or more times larger than the area of the coupler coils. The area ratio between the receive coil and the coupler coil may be constrained, as discussed in more detail below, by a configuration of a host object that supports the receive coil and the coupler coil.

FIG. 4 illustrates an example of an apparatus that may be configured to deliver power to a device wirelessly. FIG. 4 illustrates an apparatus 400 that includes a host object 402 and a coil assembly 420. In preparation for delivering a signal to a device 408, the device 408 may be placed on the host object 402. The coil assembly 420 is an example of the coil assembly 104 and may include a receive coil 416 and a coupler coil 408. The device 408 may be placed in close proximity to the coupler coil 408. The coil assembly 420 may also include a controller 410.

FIG. 4 illustrates that the coil assembly 420 is incorporated into the host object 402. The coil assembly 420 may be attached to the host objet 402, embedded into and/or supported by the host object 402, or otherwise associated with the host object 402 in different manners. For example, the coil assembly 420 may be embedded in the host object 402 such that the coil assembly 420 is not visible. The host object 402 may include a pocket or cavity that is shaped to receive the coil assembly 420. The host object 402 may be molded around the coil assembly 420. If the coil assembly 420 (or portion thereof) is accessible, the host object 402, for example, may include a removable cover. Alternatively, the coil assembly 420 may be permanently embedded in or incorporated into the host object 402.

The receive coil 404 of the coil assembly 420 is typically disposed near a perimeter of the host object 402. The location of the receive coil 404 is selected such that an area of the receive coil 404 is large or such that the receive coil 404 may be configured to have a large area in the context of the host object 402. The host object 402 may be, by way of example only and not limitation, a mouse pad, a backpack, a coat or other article of clothing, a rug, a table, a desk, or the like. Because the receive coil 404 is flexible, the receive coil 404 can bend or move with movement of the host object 402 without adverse effects on the operation of the coil assembly 420.

The coil assembly 420 also includes the coupler coil 406. The coupler coil 406 may be positioned at different locations relative to the receive coil 404 and/or relative to the host object 402. In the illustrative embodiment of FIG. 4, the receive coil 404 is centrally located such that a device 408 can be supported by a surface of the host object 402 while coupled to the coupler coil 406.

In FIG. 4, the device 408 is positioned over the receive coil 406. Because the receive coil 406 may not be visible, an indicator 412 may be provided in or on the host object 402. The indicator 412 may be a visible indicator. When the device 408 is optimally placed relative to the coupler coil 406, the indicator 412 may visually indicate that the device 408 is properly positioned (e.g., by a certain color, by a continuous output, or the like). Non-optimal placement may be indicated by a different color or by blinking. A marking 418 may also be provided on a surface of the host object 402 to aid a user to place the device 408 on the host object 402. The indicator 412 can convey a state of the apparatus 400. The state may be, for example, whether the receive coil is coupled to the transmit coil or whether the device 408 is properly positioned relative to the coupler coil. For example, a red LED may indicated that the receive coil is magnetically coupled and a green LED may indicate further that the device is optimally placed.

In the illustrative embodiment of FIG. 4, the wire that forms the receive coil 404 and the coupler coil 406 crosses itself at a location 414. The portions of the wire crossing at the location 414 are not in electrical contact.

FIG. 4 also illustrates a controller 410. The controller 410 is connected to the coil assembly 420. When the coil assembly 420 is coupled to a transmit coil, the resulting voltage/current in the coil assembly is sufficient to power the controller 410. In an illustrative example, the controller 410 is configured to adjust a resonant frequency of the coil assembly 420. The resonant frequency of the coil assembly 420 may need to be adjusted for various reasons, such as changes in characteristics of the coil assembly 420, changes in the signal received by the coil assembly 420, environmental changes, or the like or combination thereof. The resonant frequency of the coil assembly 420 is for both the receive coil and the coupler coil.

For example, the host object 402 may be an object that is subject to movement that can cause a change in the shape or other characteristic of the coil assembly 420. For example, the host object 402 could be a non-rigid object and/or a mobile object such as a backpack, an article of clothing, a rug, a picture, or the like. When the coil assembly is embedded in or integrated into a host object such as a backpack or an article of clothing, the coil assembly 420 is subject to at least changes in shape and orientation. The controller 410 can adapt the resonant frequency of the coil assembly 420 such that the resonant frequency continues to match the received transmit frequency with consequent efficient coupling.

In addition, the host object 402 could be an object that is intended to be used by multiple users. A table in a restaurant, for example, could serve as a charging station when the coil assembly 420 is incorporated into the table. Every user that sits at such a table could charge his or her device at the table. The host object 402 may also be specific to a particular user. A coat or backpack, for example, is specific to a particular user.

In one example, both the receive coil 404 and a coupler coil 406 could be used to charge different devices at the same time. The larger receive coil 404 could be coupled to an antenna of a larger device such as a laptop computer or a tablet device while the relatively smaller coupler coil 406 could be coupled to an antenna of a smaller device such as a smartphone or game controller.

FIG. 4 illustrates that the controller 410 is connected to the wire forming the receive coil 404 and the coupler coil 406. The controller 410 may connect at two different locations and can connect at any two locations. For example, leads 416 can connect to the receive coil 404, the coupler coil 406, or both.

The controller 410 can be configured to determine a voltage and/or a current associated with the receive coil 404 and the coupler coil 406. Information derived from these values can be used to change the resonant frequency of the coil assembly 420. The controller 410 can also use these values to determine whether the device 408 is optically placed on the host object 402.

Figure 5:
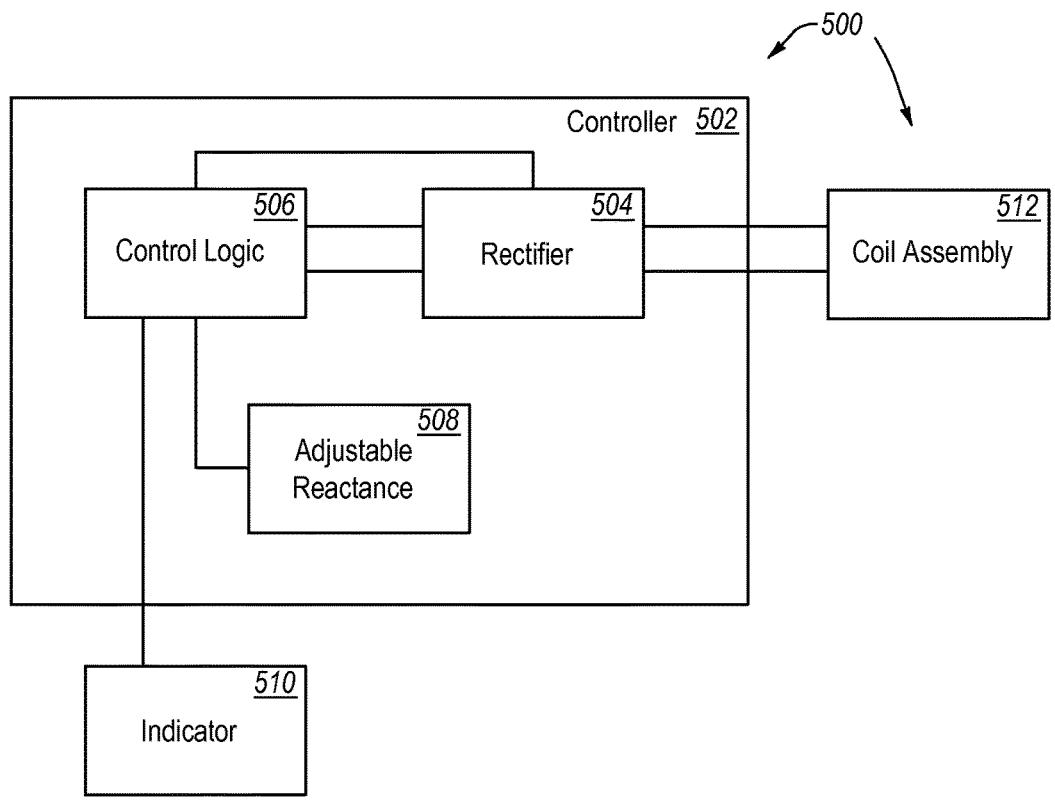
FIG. 5 illustrates an example of a controller that may be included in a coil assembly and an indicator.

FIG. 5 illustrates an example of a controller that may be included in a coil assembly and an indicator. FIG. 5 illustrates a controller 502, which may, in some examples, be equivalent to the controller 410 of FIG. 3 or the controller 212 of FIG. 2. The controller 502 may be connected to or integrated with a coil assembly 512, which is an example of the coil assembly 104.

The controller 502 may include a rectifier 504, control logic 506, and an adjustable reactance 508. The adjustable reactance may include an adjustable capacitance. The controller 502 may be configured to ensure that the resonant frequency of the coil assembly 512 matches or substantially matches the transmit frequency of the transmit coil. By matching the resonant frequency of the coil assembly 512 to the transmit frequency of the transmit coil, power transfer is maximized. In one example, the rectifier 504 is configured to output a voltage. The control logic 506 can match the resonant frequency of the coil assembly 512 to the transmit frequency by evaluating the output of the rectifier 504. In one example, control logic 506 may monitor an output of the rectifier 504. The input to the rectifier 504 may be from the coil assembly 512.

Once a measurement of the output of the rectifier 504 is performed, the adjustable reactance 508 is altered and a measurement is taken of the output of the rectifier 504. The adjustable reactance 508 is adjusted in this manner until the output of the rectifier 504 is maximized. When the output of the rectifier is maximized, the resonant frequency is matched to the transmit frequency of the transmit coil.

The indicator 510 may be configured to indicate when, with reference to FIG. 4, the device 408 is optimally placed with respect to the coupler coil 406. In one illustrative example, the device 408 is optimally placed based on a relationship between a current and a voltage in the coil assembly 512. The relationship between the current and the voltage (e.g., relative phases) can identify when power absorbed by the device 408 is maximized. The control logic 506 is also configured to measure the phases of the current and the voltage associated with the coil assembly. When the power absorbed by the device 408 is maximized, the indicator 510 may be activated. In one example, the indicator 510 may be a LED that indicates when the device 408 is optimally placed on the host object 402.

In one example, the adjustable reactance 508 includes an adjustable capacitance. The adjustable capacitance may include an adjustable capacitor. The adjustable capacitance may be a MOSFET switching network or a MEMs variable capacitor array. The control logic 506 adjusts the adjustable reactance or the adjustable capacitance in a direction maximizes the voltage of the coil assembly 512 ($V_R$). The controller 520 can operate continually to optimize the power delivering capabilities of the coil assembly 512.

Figure 6:
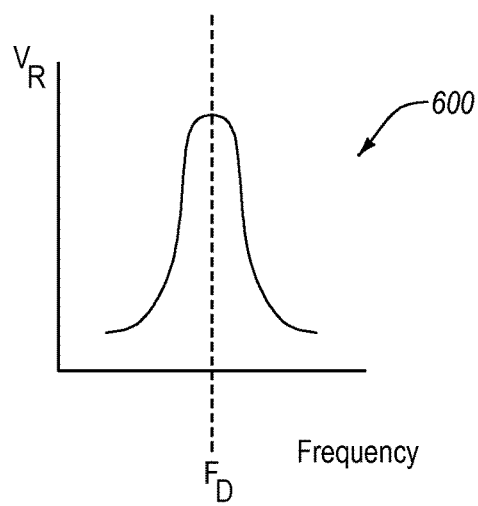
FIG. 6 illustrates an example of a relationship between a voltage received by the controller and a drive frequency.

FIG. 6 illustrates an example of a relationship between a voltage received by the controller and a drive frequency. More specifically, FIG. 6 illustrates a relationship, with reference to FIG. 5, between a voltage of the coil assembly 512 received ($V_R$) by the controller and a drive frequency $f_D$ of a transmit coil. The resonant frequency of the coil assembly is altered to match the drive frequency. As previously stated, this can be achieved by adjusting the adjustable capacitance or the adjustable reactance 508. In order to ensure a good match the adjustable capacitance may be adjustable in small steps. In one example, because a resonance peak $\Delta f/f \sim 1/Q$ and because Q may be on the order of hundreds, each step should be less than or equal to 0.1% of the total capacitance in one example.

Figure 7:
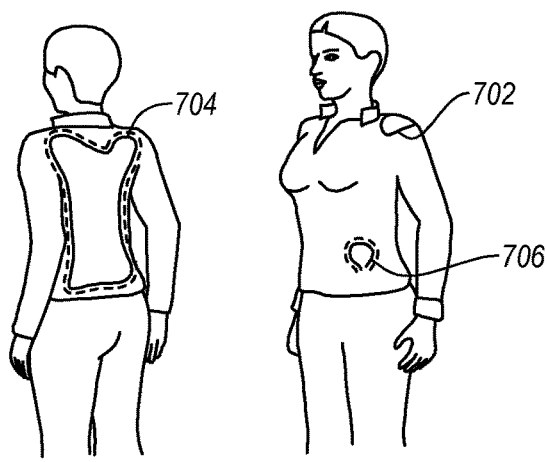
FIG. 7 is an illustrative example of an apparatus for delivering power to a device.

FIG. 7 is an illustrative example of an apparatus for delivering power to a device. FIG. 7 illustrates a person that is wearing an article of clothing 702 (a shirt in this example). The article of clothing 702 is an example of a host object. A receive coil 704 is incorporated into the host object 702. The receive coil 704 can be sewn into the article of clothing 702, for example near seams. In one example, the receive coil 704 is may large be incorporating the receive coil 704 into a perimeter associated with a back of the article of clothing 702. A coupler coil 706 may be located at a pocket or pouch in the clothing 702. The receive coil 706 may be incorporated into a seam of the pocket.

When a device is placed in the pocket or pouch of the clothing 702 and when the coil assembly (e.g., the receive coil 704 and the coupler coil 706) is magnetically coupled with a signal source such as a transmit coil, an antenna of the device couples with the receive coil 706 and power can be delivered to the device. An indicator and a controller may also be incorporated into the article of clothing 702. Thus, the coil assembly can deliver a signal to the device when magnetically coupled to the device. In one example, the signal is a magnetic field. In one example, power or a signal is wirelessly delivered to a device as the magnetic field of the coil assembly (e.g., the coupler coil) interacts with the device's antenna to induce a current in the antenna.

Figure 8:
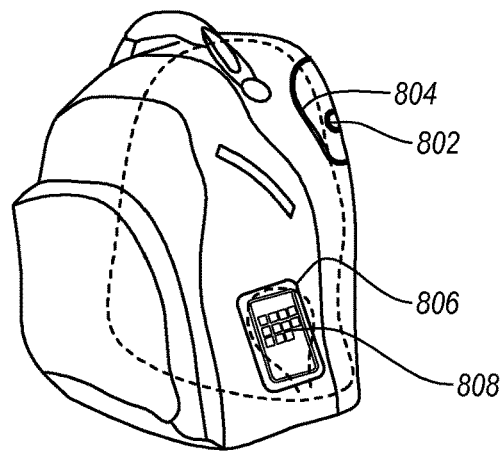
FIG. 8 illustrates another example of an apparatus for delivering power to at least one device.

FIG. 8 illustrates another example of an apparatus for delivering power to at least one device. FIG. 8 illustrates a host object 802, which is a backpack in this example. A receive coil 804 and a coupler coil 806 are embedded in or are incorporated into the host object 802. The receive coil 804 is large in terms of area compared to the coupler coil 806 and is located at a perimeter of the host object 802. The coupler coil 806 is disposed in a location near or adjacent a pocket that can receive a device 808.

When the device is placed in the pocket, the coupler coil 806 can deliver power to the device 808. At the same time in one illustrative example, the receive coil 804 could also deliver power to another device inside the backpack such as a laptop. The receive coil 804 may be located in the backpack such that the receive coil 804 can couple with the laptop computer. The backpack may include an internal pocket sized to receive a laptop computer. Alternatively, the laptop or other device can simply be placed inside of the host object 802 or laid on the exterior of the host object 802 such that an antenna of the host object 802 can couple with the receive coil 804. The controller and/or indicator can be disposed at any convenient location. Because the host object 802 has a specific place to receive the device 808, an indicator may not be necessary for the placement of the device 808. The host object 802 may also include markings to indicate where the device should be placed.

FIGS. 7 and 8 illustrate examples of host objects that are not fixed or that are non-rigid. These types of host objects are subject to changes in shape. As a result, characteristics (e.g., shape, orientation, area) of the coil assemblies may also change. The controller can ensure that efficient coupling of the coil assemblies to the transmit coil remains high by adjusting the resonant frequency to account for changes in the characteristics.

For this and other processes and methods disclosed herein, the operations performed in the processes and methods may be implemented in differing order. Furthermore, the outlined operations are only provided as examples, and some of the operations may be optional, combined into fewer steps and operations, supplemented with further operations, or expanded into additional operations without detracting from the essence of the disclosed embodiments.

Figure 9:
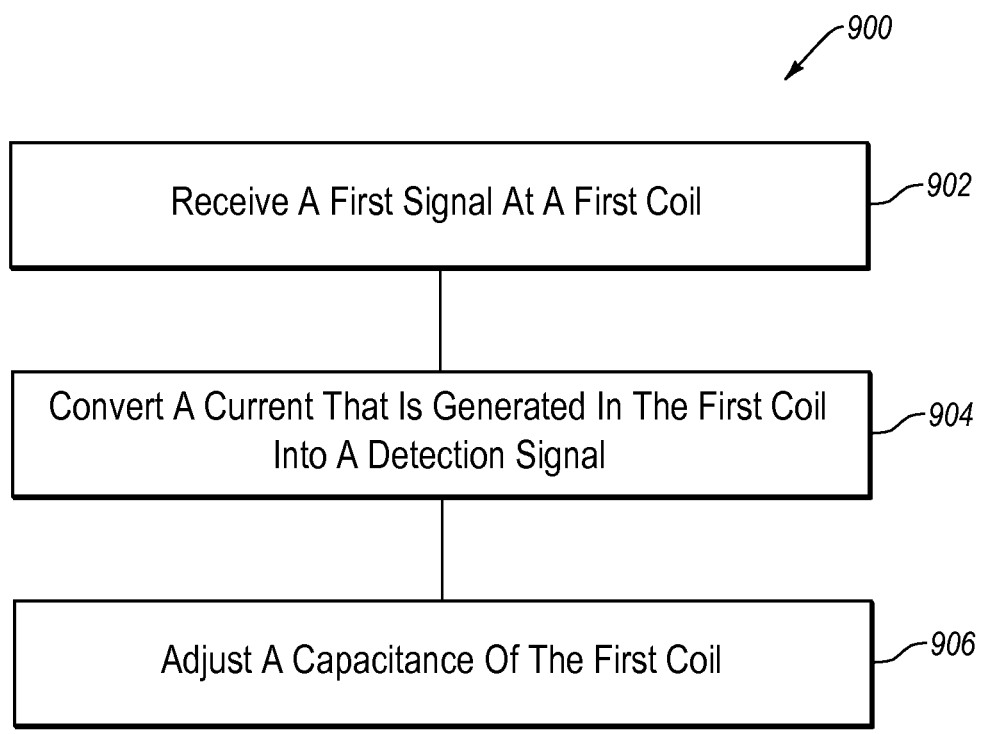
FIG. 9 illustrates an example of a method for wirelessly transferring energy to a device with an apparatus.

FIG. 9 illustrates an example of a method for wirelessly transferring energy to a device with an apparatus. FIG. 9 illustrates an example of a method 900 for wirelessly transferring energy to a device. In block 902 (Receive a First Signal at a First Coil), a first signal is received at a first coil. The signal may originate in a transmit coil that is driven at a drive frequency. The first coil receives the first signal when magnetically coupled with the transmit coil. When the first coil is magnetically coupled with the transmit coil, a current is induced in the first coil.

In block 904 (Convert a Current that is Generated in the First Coil into a Detection Signal), the current that is generated in or induced in the first coil becomes a detection signal. The detection signal may be generated, for example, when the current is converted into a DC voltage. Alternatively, the current generated in the first coil is converted into a detection signal by sensing a voltage in the first coil.

In block 906 (Adjust a Capacitance of the First Coil), a capacitance (or inductance, or both capacitance and inductance) of the first coil is adjusted. In an illustrative example of the method 900, the capacitance is adjusted based on the detection signal such that a resonant frequency of the first coil matched a drive frequency of the drive signal received by the first coil. The resonant frequency matches the drive frequency when the detection signal is maximized in one example.

For example, the detection signal may include a voltage associated with the first coil. If the capacitance is reduced and the voltage decreases, then the capacitance is increased. The capacitance may be adjusted in steps in either direction (increased/decreased capacitance) until the voltage is maximized. The steps may be small relative to a total available capacitance value, for example in increments of, for example, 0.01%-10% of a total available capacitance. The capacitance may be continually evaluated at least because the characteristics (e.g., shape, area) could change at any time.

Because the controller associated with the coil assembly may only operate when the coil assembly is magnetically coupled with a transmit coil, the controller may adjust the reactance or capacitance as described herein regardless of an initial value of the reactance or the capacitance. Alternatively, a memory may be used to store potential values that can be set as an initial starting point. The potential values can be based on an anticipated drive frequency, and an expected configuration of the coil assembly.

In one example, a system for delivering a signal to a coil disposed inside a device such that the device receives power wirelessly may include a host object and a first coil that is incorporated into the host object. The first coil may be responsive to a first signal received by the first coil. The system may include second coil that may also be incorporated into the host object. The second coil may be configured to couple with the coil disposed inside the device to transfer power to the device. The system may include a controller configured to determine when the second coil is delivering a signal. The controller may adapt a resonant frequency of the first coil in response to changes in an area of the first coil.

In one example, an area of the first coil is greater than an area of the second coil. The first coil and the second coil may be formed from a flexible wire that includes at least one turn. The second coil may be formed from a portion of a flexible wire that forms the first coil. The flexible wire may cross itself at a location such that the first coil is on a first side of the location and the second coil is on a second side of the location.

The controller may include an adjustable capacitance and/or adjustable inductance that is adjusted in response to changes in an area of at least the first coil to adapt the resonant frequency of the first coil such that the resonant frequency matches a drive frequency of the transmit coil.

In addition, the controller may be configured to adjust the adjustable capacitance in steps. Each of the steps may less than or equal to 0.1% of a total capacitance of the adjustable capacitance. An LED may indicate a state of the system.

In one example, the controller includes a rectifier configured to convert a current in the first coil to a voltage. The controller adapts the resonant frequency by changing an adjustable impedance until the voltage is maximized. The controller connects to the first coil and is powered by a current induced in the first coil by the first signal.

The host body may include markings that identify where to place the device in order to couple the coil disposed inside the device with the second coil.

In one example, an apparatus configured to deliver wireless power to an electronic device may include a receive coil. The receive coil may be configured to produce an electrical signal in response to magnetic radiation. The apparatus may also include a coupler coil connected with the first coil such that the electrical signal passes through the coupler coil. An area of the receive coil is at least two times greater than an area of the coupler coil. However, the relative areas of the receive coil and the coupler coil may have other ratios that are less than two. The apparatus may include an adjustable capacitance that includes an adjustable capacitor. The adjustable capacitor may be configured so that the receive coil has a resonant frequency correlated with the adjustable capacitance. The apparatus may include a controller configured to adjust the adjustable capacitor so that the resonant frequency of the receive coil is approximately equal to a frequency of the magnetic radiation from a transmit coil. The apparatus may further include a host object. In one example, the receive coil, the coupler coil, and the controller are supported by the host object. The host object may also be configured to support the electronic device such that the coupler coil delivers wireless power to the electronic device when the magnetic radition is present.

In one example, the first coil, the second coil, and the controller are embedded in the host object. The host object may be a flexible pad. The host object has a host surface, and the host surface may include a visually or tactilely discernable marking indicating an approximate location of the second coil.

The first coil may be at least partially disposed around a peripheral portion of the host object. The first coil may be disposed in the host object so as to have a comparatively large size.

In one example, a method for providing wireless energy to an electronic device that includes a device coil includes placing the electronic device on a surface of a host object and receiving the wireless energy through a coupling between the device coil and the coupler coil. The host object may include a receive coil and a coupler coil. A current is induced in receive coil by an ambient magnetic field and the current flows through the coupler coil to provide the wireless energy. The method may also include adjusting a capacitance and/or an inductance associated with the receive coil such that a resonant frequency of the receive coil is approximately matched to a frequency of the magnetic radiation.

In one example, an apparatus for delivering a signal to a device may include a first coil configured to receive an input signal. A current induced in the first coil is responsive to the input signal. The apparatus may include a second coil connected with the first coil such that the current is present in the second coil. A magnetic field associated with the current in the second coil generates the signal in the device. A controller of the apparatus may be configured to adjust a resonant frequency of the first coil to correlate with a frequency of the input signal.

Figure 10:
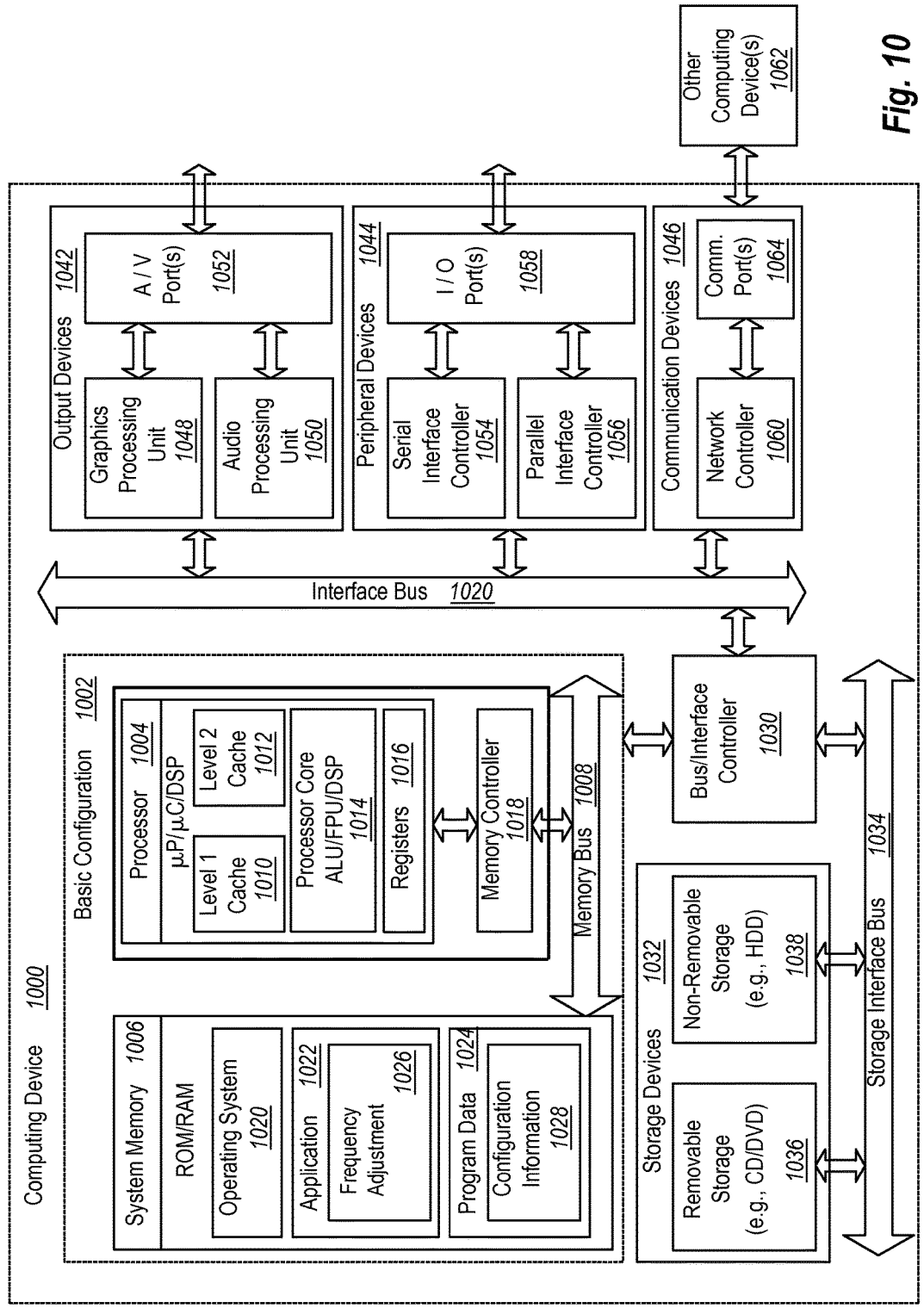
FIG. 10 shows an example computing device that is configured to adapt a resonant frequency of a coil assembly in accordance with the present disclosure.

FIG. 10 shows an example computing device that is configured to adapt a resonant frequency of a coil assembly in accordance with the present disclosure. The controller 502, as illustrated in FIG. 5, may include a computing device.

In a very basic configuration 1002, computing device 1000 generally includes one or more processors 1004 and a system memory 1006. A memory bus 1008 may be used for communicating between processor 1004 and system memory 1006.

Depending on the desired configuration, processor 1004 may be of any type including but not limited to a microprocessor (µP), a microcontroller (µC), a digital signal processor (DSP), or any combination thereof. Processor 1004 may include one more levels of caching, such as a level one cache 1010 and a level two cache 1012, a processor core 1014, and registers 1016. An example processor core 1014 may include an arithmetic logic unit (ALU), a floating point unit (FPU), a digital signal processing core (DSP Core), or any combination thereof. An example memory controller 1018 may also be used with processor 1004, or in some implementations memory controller 1018 may be an internal part of processor 1004. In one embodiment, the controller 508 of FIG. 5 may be embodied by the processor 1004 and/or other components of the computing device 1000.

Depending on the desired configuration, system memory 1006 may be of any type including but not limited to volatile memory (such as RAM), non-volatile memory (such as ROM, flash memory, etc.) or any combination thereof. System memory 1006 may include an operating system 1020, one or more applications 1022, and program data 1024. Application 1022 may include frequency adjustment application 1026 that is arranged to perform at least some of the operations as described herein including at least some of those described with respect to method 900 in FIG. 9. Program data 1024 may include configuration information 1028 that may be useful to adjust a resonant frequency of a coil assembly, and/or may include other information usable and/or generated by the various other modules/components described herein. The configuration information 1028 may include capacitance values, reactance values, inductance values, drive frequencies, coil areas, or the like. In some embodiments, application 1022 may be arranged to operate with program data 1024 on operating system 1020 such that optical components are formed and reconfigured as described herein. This described basic configuration 1002 is illustrated in FIG. 10 by those components within the inner dashed line.

Computing device 1000 may have additional features or functionality, and additional interfaces to facilitate communications between basic configuration 1002 and any required devices and interfaces. For example, a bus/interface controller 1030 may be used to facilitate communications between basic configuration 1002 and one or more data storage devices 1032 via a storage interface bus 1034. Data storage devices 1032 may be removable storage devices 1036, non-removable storage devices 1038, or a combination thereof. Examples of removable storage and non-removable storage devices include magnetic disk devices such as flexible disk drives and hard-disk drives (HDDs), optical disk drives such as compact disk (CD) drives or digital versatile disk (DVD) drives, solid state drives (SSDs), and tape drives to name a few. Example computer storage media may include volatile and nonvolatile, removable and non-removable media implemented in any method or technology for storage of information, such as computer readable instructions, data structures, program modules, or other data.

System memory 1006, removable storage devices 1036 and non-removable storage devices 1038 are examples of computer storage media. Computer storage media includes, but is not limited to, RAM, ROM, EEPROM, flash memory or other memory technology, CD-ROM, digital versatile disks (DVDs) or other optical storage, magnetic cassettes, magnetic tape, magnetic disk storage or other magnetic storage devices, or any other medium which may be used to store the desired information and which may be accessed by computing device 1000. Any such computer storage media may be part of computing device 1000.

Computing device 1000 may also include an interface bus 1040 for facilitating communication from various interface devices (e.g., output devices 1042, peripheral interfaces 1044, and communication devices 1046) to basic configuration 1002 via bus/interface controller 1030. Example output devices 1042 include a graphics processing unit 1048 and an audio processing unit 1050, which may be configured to communicate to various external devices such as a display or speakers via one or more A/V ports 1052. Example peripheral interfaces 1044 include a serial interface controller 1054 or a parallel interface controller 1056, which may be configured to communicate with external devices such as input devices (e.g., keyboard, mouse, pen, voice input device, touch input device, etc.) or other peripheral devices (e.g., printer, scanner, etc.) via one or more I/O ports 1058. An example communication device 1046 includes a network controller 1060, which may be arranged to facilitate communications with one or more other computing devices 1062 over a network communication link via one or more communication ports 1064.

The network communication link may be one example of a communication media. Communication media may generally be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 1000 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 1000 may also be implemented as a personal computer including both laptop computer and non-laptop computer configurations.

In some examples, an advantage of a larger size of the receive coil (relative to the coupler coil) is that the current induced in the receive coil is appreciably enhanced by the larger area exposed to the magnetic field. In some examples, the transmit coil may be proximate the receive coil, allowing inductive coupling between the transmit and receive coils, though this is not necessary. In some examples, the orientation of the receive coil may be adjustable, for example to increase the signal induced in the receive coil. For example, a receive coil may be adjusted to be more parallel to a transmit coil. An example coil assembly may include a receive coil, a coupler coil electrically in series with the receive coil, and optionally an adjustable capacitor and/or inductor for adjusting the resonance of the coil assembly (e.g. resonant cooperatively with any other reactive component) to match or approximately match the transmit frequency. The receive coil and the coupler coil in a coil assembly may be formed from a single continuous wire.

In some examples, an apparatus for delivering a signal to a device comprises a first coil (which may also be termed a receive coil), the receive coil having a larger physical extent that the exterior dimensions of the device. In some examples, the larger physical extent of the receive coil may allow increased wireless power to be received by the device (e.g. compared with the use of a device antenna alone to receive wireless power from a transmit coil). In some examples, at least one dimension of the receive coil (e.g. a diameter of a circular coil or an edge length of a generally rectangular coil) may be at least twice that of the largest exterior dimension of the device (e.g. the longest edge length of a generally rectangular device). In some examples, the receive coil may include multiple turns, allowing enhanced power reception without adding weight to the device. The apparatus may further comprise a second coil (which also may be termed a coupling coil), which may be configured to couple wireless energy efficiently at short range into the device antenna. The device antenna may comprise a device coil. In some examples, the physical dimensions of the coupler coil may approximately match those of the device coil. The apparatus may further comprise a controller, comprising control electronics configured to adjust the resonant frequency of the receive coil (e.g. cooperatively with other reactive elements) to that of the electromagnetic field at the receive coil (which may also be termed the ambient electromagnetic field).

In some examples, an apparatus may comprise components, such as a coil assembly, housed or otherwise supported in or by a host object. The host object may be part of the apparatus, for example providing additional functionality such as a resting place for a device. A host object may be, for example, a mat on which the device may be placed (for example, flexible mat such as a mouse pad, and the like), clothing (for example, a shirt, jacket, hat, and the like), furniture (such as desk or chair), or an external accessory (such as a backpack, handbag, pet carrier, and the like). The device may be a portable electronic device, for example a device having one or more functions selected from those of a smartphone, a computer, a global positioning or other location device, a camera, a game controller, a tablet, or another function. The device may be or comprise a rechargeable battery.

In some examples, an apparatus for delivering a signal to a device comprises a flexible pad, for example a flexible pad configured to be placed beneath the device. The device may include a device antenna, such as a device coil, but the physical dimensions of the device coil are generally limited by the actual device dimensions. Hence, in some examples, without use of the apparatus the rate of wireless power transfer to the device may be restricted by the physically limited extent of the device coil. The flexible pad may include a large (relative to the physical dimensions of the device, and/or the physical dimensions of the device coil) receive coil. The receive coil may receive wireless power from an external transmit coil, for example in the form of a signal induced in the receive coil by an alternating electromagnetic field generated by the transmit coil. The signal generated in the receive coil may pass through a coupling coil. The coupling coil may have an area less than or similar to that of the device and/or that of the device coil, allowing the device to be placed onto apparatus so that the device antenna, such as a device coil, is located proximate the coupling coil. In some examples, the apparatus includes a visual indication, such as an LED, and is configured to illuminate the visual indication when the device is placed on the flexible pad such that there is appreciable power transfer from the apparatus to the device, for example power transfer above a predetermined threshold. The apparatus may include an electronic circuit, for example as part of a controller, that is configured to adjust the resonant frequency of the apparatus (e.g. the resonant frequency of the coil(s) and any associated reactive elements) to match the transmitted frequency.

In some examples, the signal generated by the receive coil may be transmitted to the device by an electric field via capacitive coupling, which in some examples may be an alternative, or additional, to magnetic field coupling. The coil assembly could be adapted to include a plate and the device may also include a plate such that the power is transmitted electrically. In some examples the signal generated by the receive coil may be rectified, voltage adjusted if necessary, and available as a direct current output suitable for recharging one or more batteries, for example one or more batteries within the device, and/or in some examples within the apparatus itself.

In some examples, the apparatus receives power through a signal generated in the receive coil and couples the signal into a smaller coupling coil. In some examples, when the device coil has inductive coupling with the coupler coil, the power transfer to the device may be augmented by a factor as large as the square of the area ratio of the receive coil relative to the device coil. One or more indicator lights may be used to indicate the presence of the ambient electromagnetic or magnetic field, and appreciable power transfer to the device. The controller may be configured to adjust a variable reactive element such as a capacitance to adjust and maintain the resonant frequency at a predetermined value, such as the transmit frequency. Coupling problems due to variations in resonant frequency, for example due to minor mechanical deformations of the coil, for example due to bending of a flexible pad supporting the coil, may thereby be ameliorated.

The present disclosure is not to be limited in terms of the particular embodiments described in this application, which are intended as illustrations of various aspects. Many modifications and variations can be made without departing from its spirit and scope. Functionally equivalent methods and apparatuses within the scope of the disclosure, in addition to those enumerated herein, are possible from the foregoing descriptions. Such modifications and variations are intended to fall within the scope of the appended claims. The present disclosure is to be limited only by the terms of the appended claims, along with the full scope of equivalents to which such claims are entitled. This disclosure is not limited to particular methods, reagents, compounds compositions or biological systems, which can, of course, vary. The terminology used herein is for the purpose of describing particular embodiments only, and is not intended to be limiting.

In an illustrative embodiment, any of the operations, processes, etc. described herein can be implemented as computer-readable instructions stored on a non-transitory computer-readable medium. The computer-readable instructions can be executed by a processor of a mobile unit, a network element, and/or any other computing device.

The use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware are possible in light of this disclosure. In addition, the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those generally found in data computing/communication and/or network computing/communication systems.

The herein described subject matter sometimes illustrates different components contained within, or connected with, different other components. Such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an"

limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, various embodiments of the present disclosure have been described herein for purposes of illustration, and various modifications may be made without departing from the scope and spirit of the present disclosure. Accordingly, the various embodiments disclosed herein are not intended to be limiting, with the true scope and spirit being indicated by the following claims.

What is claimed is:

1. An apparatus to deliver a signal from a transmit coil to a device, the apparatus comprising:
   a host object;
   a first coil configured to receive a transmit signal from the transmit coil such that a first signal is induced in the first coil;
   a second coil connected with the first coil such that the first signal is present in the second coil, wherein the second coil is configured to couple with the device, wherein the device includes an electronic communication device, wherein the first coil is larger in area than the second coil, wherein the first coil is located at a perimeter of the host object, and wherein the first coil and the second coil are configured to charge different electronic communication devices at a same time;
   a controller configured to adjust a resonant frequency of the first coil to match a drive frequency of the transmit coil, wherein the controller is incorporated into the host object; and
   an indicator incorporated into the host object and configured to indicate that the device is positioned at a specific position with respect to the second coil.

2. The apparatus of claim 1, wherein the first coil and the second coil are formed from a loop of wire that includes at least one turn, wherein a portion of the loop of wire crosses itself at a location to form the first coil and the second coil, and wherein the first coil is separated from the second coil at the location.

3. The apparatus of claim 1, wherein the first coil and the second coil are formed from a loop of wire that includes at least one turn, and wherein a portion of the loop of wire is brought close together without crossing at a location to form the first coil and the second coil.

4. The apparatus of claim 3, wherein the loop of wire is flexible such that an area of the first coil changes in accordance with a change in a shape of the first coil.

5. The apparatus of claim 4, wherein the controller is configured to adjust the resonant frequency in response to the change in the area of the first coil.

6. The apparatus of claim 5, wherein the controller comprises:
   a rectifier that is connected to the loop of wire and that is configured to generate a voltage from a portion of the first signal that is correlated with a current in the loop of wire, wherein the voltage powers the controller;
   an adjustable capacitance coupled with the first coil; and
   control logic configured to adjust the adjustable capacitance to adjust the resonant frequency of the first coil such that the resonant frequency matches the drive frequency, wherein the resonant frequency matches the drive frequency when the voltage is maximized.

7. The apparatus of claim 6, wherein the adjustable capacitance is adjustable in steps that are less than or equal to 0.1% of a total capacitance.

8. The apparatus of claim 7, wherein the adjustable capacitance includes a MOSFET switching network or a MEMs variable capacitor array.

9. The apparatus of claim 1, wherein the controller is configured to:
   determine power delivered to the device via the second coil based on relative phases of a current and a voltage of the first signal in the first coil, and
   output a status that indicates when the device is positioned at the specific position with respect to the second coil.

10. The apparatus of claim 1, wherein the host object includes at least one of: a mouse pad, an article of clothing, a furniture, or an external accessory.

11. An apparatus configured to couple with a transmit coil to deliver a signal to a device, the apparatus comprising:
a host object;
a coil assembly that is attached to the host object, wherein the coil assembly is configured to couple with the transmit coil such that the coil assembly delivers a first signal to the device, wherein the device includes an electronic communication device, wherein the coil assembly includes a receive coil and a coupler coil configured such that the first signal induced in the receive coil is present in the coupler coil, and wherein the receive coil and the coupler coil are configured to deliver power to different electronic communication devices at a same time;
a controller configured to change a resonant frequency of the coil assembly to match a drive frequency of the transmit coil, wherein the controller is incorporated into the host object; and
an indicator incorporated into the host object and configured to indicate that the device is positioned at a specific position with respect to the coupler coil.

12. The apparatus of claim 11, wherein the coil assembly is incorporated into a body of the host object.

13. The apparatus of claim 11, wherein the receive coil is configured to be responsive to a second signal generated by the transmit coil, and wherein the coupler coil is configured to provide the first signal to the device in response to the second signal.

14. The apparatus of claim 13, wherein the coil assembly comprises at least one turn of a wire.

15. The apparatus of claim 14, wherein the coupler coil and the receive coil are formed from the wire.

16. The apparatus of claim 15, wherein the wire is twisted at a location such that a first portion of the wire overlaps a second portion of the wire in order to form the receive coil apart from the coupler coil, and wherein an area of the receive coil is larger than an area of the coupler coil.

17. The apparatus of claim 16, wherein the coupler coil is located inside of the area of the receive coil or outside of the area of the receive coil.

18. The apparatus of claim 14, wherein a radius of the wire is about 1% of a radius of the coil assembly.

19. The apparatus of claim 13, wherein the controller is coupled to the coil assembly, and wherein the controller includes:
a rectifier;
control logic; and
an adjustable capacitance,
wherein the rectifier is configured to convert a portion of a current, in the coil assembly that is generated in response to the second signal, into a third signal,
wherein the control logic is configured to adjust the adjustable capacitance to maximize a value of the third signal, and
wherein the resonant frequency matches the drive frequency when the third signal is maximized.

20. The apparatus of claim 19, wherein the third signal is correlated with the current in the coil assembly, and wherein the rectifier is further configured to generate a power signal to power the control logic.

21. The apparatus of claim 19, wherein the adjustable capacitance is adjusted in accordance with changes in a shape of the coil assembly.

22. The apparatus of claim 19, wherein the controller includes at least one LED that indicates a state of the apparatus.

23. The apparatus of claim 22, wherein the state of the apparatus includes a first state in which the at least one LED indicates that the coil assembly is responsive to the second signal generated by the transmit coil, a second state in which the at least one LED indicates that the coil assembly is coupled to the device, and a third state in which the at least one LED indicates that the coil assembly is unresponsive to the second signal.

24. The apparatus of claim 13, wherein the first signal and the second signal include magnetic signals.

25. The apparatus of claim 11, wherein the receive coil is flexible.

26. A method to wirelessly transfer energy to a device within an apparatus, the method comprising:
wirelessly receiving a first signal at a first coil, by magnetically coupling the first coil with a transmit coil;
inducing a current in the first coil in response to the first signal;
converting, at the first coil, the current into a detection signal, by sensing a voltage induced in the first coil through electromagnetic induction;
adjusting a reactance associated with the first coil based on the detection signal such that a resonant frequency of the first coil matches a drive frequency of the first signal;
providing a state of the apparatus, wherein the state of the apparatus indicates one or more of:
whether the first coil is magnetically coupled to the transmit coil, and
whether the device is positioned at a specific position with respect to a second coil, wherein the second coil is connected with the first coil such that the current is present in the second coil, and wherein the device includes an electronic communication device;
indicating that the device is positioned at the specific position with respect to the second coil based on the state of the apparatus;
transferring, by the second coil, the energy to the electronic communication device; and
transferring, by the first coil, the energy to another electronic communication device, wherein the energy is transferred to the electronic communication device and the another electronic communication device at a same time.

27. The method of claim 26, wherein the reactance includes a capacitance, and the method further comprising adjusting the capacitance in steps, wherein the resonant frequency matches the drive frequency when the detection signal is maximized.

28. The method of claim 26, wherein the second coil is connected with the first coil and has an area that is smaller than an area of the first coil.

29. The method of claim 26, further comprising determining that the device is positioned relative to the second coil based on a phase relationship between the current and the voltage associated with the first coil.

* * * * *